(12) United States Patent
Frank et al.

(10) Patent No.: US 7,170,890 B2
(45) Date of Patent: Jan. 30, 2007

(54) ELECTRICAL DEVICES WITH IMPROVED COMMUNICATION

(75) Inventors: Charles Frank, Irvine, CA (US); Thomas Ludwig, San Clemente, CA (US); Thomas Hanan, Mission Viejo, CA (US); William Babbitt, Perris, CA (US)

(73) Assignee: Zetera Corporation, Irvine, CA (US)

( * ) Notice: Subject to any disclaimer, the term of this patent is extended or adjusted under 35 U.S.C. 154(b) by 301 days.

(21) Appl. No.: 10/472,800

(22) PCT Filed: Dec. 16, 2002

(86) PCT No.: PCT/US02/40198

§ 371 (c)(1),
(2), (4) Date: Mar. 25, 2004

(87) PCT Pub. No.: WO2004/044732

PCT Pub. Date: May 27, 2004

(65) Prior Publication Data

US 2004/0258059 A1    Dec. 23, 2004

(51) Int. Cl.
*H04L 12/28* (2006.01)
(52) U.S. Cl. .................................... 370/389
(58) Field of Classification Search ............... 370/389, 370/353, 354, 355, 386, 378, 392, 277, 349, 370/352, 471, 395.52, 278, 225; 386/46; 345/169; 714/749
See application file for complete search history.

(56) References Cited

U.S. PATENT DOCUMENTS

| | | | |
|---|---|---|---|
| 5,634,111 A | 5/1997 | Oeda et al. | 395/480 |
| 6,105,122 A | 8/2000 | Muller et al. | 712/1 |
| 6,202,060 B1 | 3/2001 | Tran | 707/3 |
| 6,288,716 B1 | 9/2001 | Humpleman et al. | 345/329 |
| 6,396,480 B1 * | 5/2002 | Schindler et al. | 345/169 |
| 6,434,683 B1 | 8/2002 | West et al. | |
| 6,741,554 B2 * | 5/2004 | D'Amico et al. | 370/225 |
| 6,795,534 B2 * | 9/2004 | Noguchi | 379/88.17 |
| 7,039,934 B2 * | 5/2006 | Terakado et al. | 725/37 |

* cited by examiner

*Primary Examiner*—Chi Pham
*Assistant Examiner*—Alexander O. Boakye
(74) *Attorney, Agent, or Firm*—Rutan & Tucker, LLP

(57) ABSTRACT

Cameras, radios, televisions, set top boxes (118), telephones, kitchen appliances, and other electrical devices have their own IP address, and communicate using an internetworking protocol. Of particular interest are those devices that utilize some form of mass storage. Communication of the packets between or among elements can occur using any suitable package switched network (or combination of networks), including the Internet (142). The preferred protocol for communicating packets is IP, and communication of the packets between elements can advantageously occur by virtualizing a native bus (120) using IP. It is especially contemplated that the inventive elements can be disaggregated outside the housing of a device, at distances of several meters or more. Communication can be hard wired, or can include wireless aspects. Adapters are also contemplated that permit traditional elements to be addressed by their own IP addresses.

22 Claims, 4 Drawing Sheets

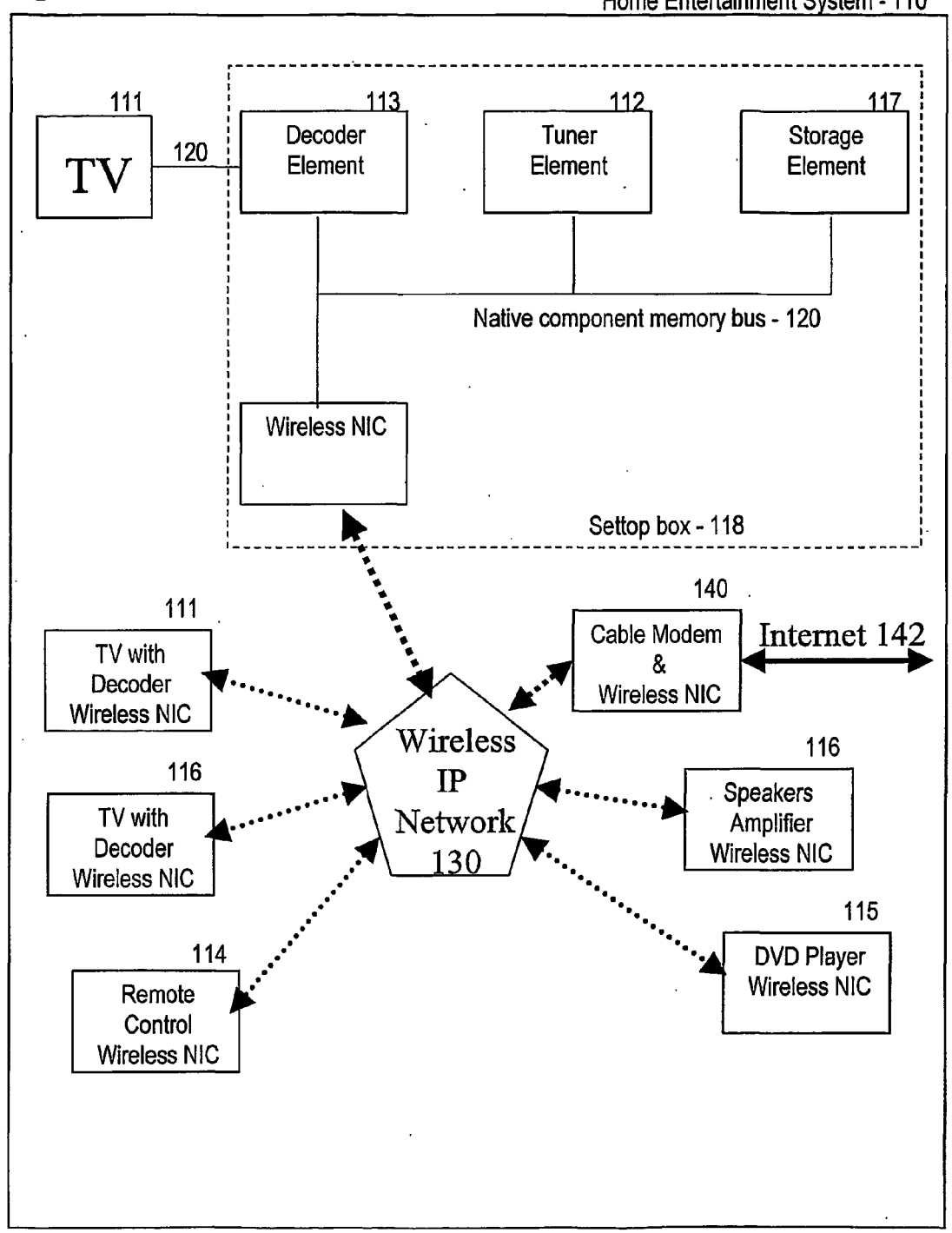

ELECTRICAL DEVICES WITH IMPROVED COMMUNICATION

This application claims the benefit of U.S. provisional application No. 60/425,867 incorporated herein by reference in its entirety.

FIELD OF THE INVENTION

The field of the invention is electrical devices having human interfaces, including especially cameras, radios, televisions, telephones, kitchen appliances, and the like.

BACKGROUND OF THE INVENTION

Audio systems have long included individual components in separate housings. Since at least the 1950s, for example, a component stereo system might well include a tuner, amplifier, tape deck, and some sort of rotating media player. Sophisticated video systems have also long been "componentized", so that a component video system might include a television linked with a VCR or DVD player, and a personal video camera or PVR.

Whether analog or digital, communication between such components has traditionally (i.e. prior to this invention) comprised a raw point-to-point data stream. A speaker, for example, merely accepts an analog signal from an amplifier. The information is assumed to be reliable, and there is no error checking, resending of information or the like. Even a DVD player sends raw data on an extension of its native bus.

Raw data transfer only works well when rigid standards are in place, the components are physically close together, and there are relatively few components being connected. In addition, components that communicate using raw data transfer are only compatible if they are designed to talk with each other. Thus, a traditional video camera has to be designed to export a standard video or other signal that could be understood by a television. Similarly, older personal computers were always designed to export data to a printer using a RS-232 standard (serial port), or a Centronics standard (parallel port), because those are the communications standards that printers could understand.

The current trend is to communicate among components (also referred to as devices herein) using packets of information. In addition to the data being transferred, packets include header information such as type of data contained in the packet, i.e. HTML, voice, ASCII, etc., and origination and destination node information. The header information permits error checking, and routing across package switched networks such as the Internet between devices that may be widely spaced apart. The header information also allows extremely disparate devices to communicate with each other—such as a clock radio to communicate with a computer. Recently published U.S. patent application no. 20020031086, (Welin, Mar. 14, 2002) refers to linking "computers, IP phones, talking toys and home appliances such as refrigerators, microwave ovens, bread machines, blenders, coffee makers, laundry machines, dryers, sweepers, thermostat assemblies, light switches, lamps, fans, drape and window shade motor controls, surveillance equipment, traffic monitoring, clocks, radios, network cameras, televisions, digital telephone answering devices, air conditioners, furnaces and central air conditioning apparatus."

Interestingly, the idea of packet interconnectivity has never previously been applied to the level of elements within a device. All of the packet addressing in prior art devices has been performed between or among devices, as opposed to between or among elements within a given device.

As used herein, the term "element" refers to a hardware unit that is a functional portion of a device, and traditionally communicates with other units of the same device across a bus, without having its own IP address. Where elements of a device communicate digitally, they have typically, but not necessarily, been located in a common housing, under the control of an operating system. In a traditional component, personal video camera (PVR) 10 of FIG. 1A, for example, a human interface 11, tuner 12, storage 13 (memory), and video decoder 14 all communicate across a memory bus 15, and are all contained within a common housing 16. The tuner uses data streaming or data blocks to talk to the storage, not packets. Similarly, in a traditional telephone enabled handheld computer (PDA), not shown, a telephone chip communicates with a memory chip and a CPU across a memory bus. The telephone chip uses data streaming or data blocks rather than packets to talk with the CPU.

Historically, it has made sense to use data streaming or data blocks across a native bus to interconnect elements within the same component. Elements sharing the same physical box of a device are already designed to work together, they are physically close, and there are relatively few of them. Reliability across the bus is assumed, and speed is usually of paramount concern. Each of the elements can readily monitor the bus, and pull off whatever data it needs. There is no need to burden the device with packetizing the data to address individual ones of the elements with distinct, element-specific addresses.

In the past, elements within different devices have been able to talk with each other using packets, but only indirectly because the elements did not have their own IP addresses. For example, it is already known for an originating element such as a disk drive in a computer to use the computer's native bus to send a data stream or series of data blocks to an IP packeting element in the computer, which in turn packetizes the communication for transmission to a disk drive within a second computer. But in such instances the second computer must translate the packet back into a data stream of series of data blocks, and then send the information along its native bus to the receiving element (which may be another disk drive, display screen, or whatever). The packets are always communicated to and from the devices, and only indirectly between elements. The originating and receiving elements never directly address each other using addresses in the packets.

A significant drawback of the prior art technology is that communication between elements that does use packets always goes through some sort of operating system. For relatively inexpensive devices, the cost of an operating system can be very significant, and in some instances prohibitive. These limitations hold true for the entire generation of "Internet ready" or "Web-enabled" appliances. In those devices, the prior art solution is to have the appliance send packets of information to a computer, which then stores or otherwise operates upon the information. This requires an operating system on some computer, either a local computer or a computer far away on the Internet. See, for example, Scenix' SX-Stack, described in "Scenix Debuts TCP/IP Embedded Chip For Internet Connectivity", Computer Protocols, vol. 12, no. 11 (Nov. 1, 1999); Zilog's eZ80, described in "Zilog Sees New Lease of Life For Z80 In Internet Appliances", Computergram International, No. 3751 (Sep. 21, 1999); and "Providing Network Connectivity For Small Appliances: A Functionally Minimized Embedded Web Server", IEEE Commun. Mag., Vol. 39, No. 10 (October 2001).

Another result of the prior art technology is limited flexibility in choosing elements for inclusion in devices. The PVR of FIG. 1A is limited to the storage element(s) intended by the designers to be used with that device. If a PVR is designed to work with a HDD, the user cannot start using a re-writable CD ROM with his camera. Similarly, a television video camera is limited to the disk drives that are supported by its bus and operating system.

Still another result of the prior art technology is limited flexibility in disaggregating elements of a device. In the video camera example of FIG. 1A, the storage element is contained within the camera itself (although the storage medium may be removable) because the storage element is connected directly to the native bus. If a user wants to increase the storage, he either has to purchase a bigger memory card, or connect his camera to the bus of a computer. The camera cannot directly utilize storage that may be elsewhere in the room. In the case of television set top box, the tuner or cable decoder elements need to be in close proximity to the television.

Thus, there is a need for improved apparatus, systems, methods and protocols by which elements of electrical devices communicate with each other.

SUMMARY OF THE INVENTION

The inventive subject matter provides elements that have their own IP address, and that communicate using packets of information addressed using those IP addresses. Individual elements can be included in a common housing with other elements, or can be employed in a disaggregated manner as part of a virtual device.

Contemplated devices include virtually all apparatus that communicate electronically with the outside world in the novel manner. This includes digital and still cameras, radios, televisions, set top boxes, telephones, and kitchen appliances, as well as computers and personal digital assistants. Of particular interest are those devices that utilize some form of mass storage, and those having a human interface such as a keyboard, display screen, audio input or output, or combinations of same.

Communication of the packets between or among elements can occur using any suitable package switched network (or combination of networks), including the Internet. The preferred protocol for communicating packets is IP, and communication of the packets between elements can advantageously occur by virtualizing a native bus using IP.

It is especially contemplated that the inventive elements can be disaggregated outside the housing of a device, at distances of several meters or more. Communication can be hard wired, or can include wireless aspects.

The addressing of elements can be done indirectly through a proxy server, although the concept is still that each of the inventive elements would have its own distinct address. In contemplated embodiments, the inventive elements can advantageously communicate with each other using a peer-to-peer protocol, and in some instances without the need for an operating system.

Still other aspects of the inventive subject matter are apparatus, systems, methods and protocols by which elements of electrical devices communicate with each other using packets of information addressed to individual ones of the elements. For example, an adapter can include a functionality (hardware, software, or some combination of the two) that allows a non-network-enabled element to execute an internetworking protocol, and be addressed by its own IP address. Such adapters are contemplated to permit traditional elements to be addressed by their own IP addresses.

Various objects, features, aspects and advantages of the inventive subject matter will become more apparent from the following detailed description of preferred embodiments along with the accompanying drawing figures.

BRIEF DESCRIPTION OF THE DRAWING

FIG. 2 is a schematic of a home entertainment system in which the elements shown are coupled by a wireless virtual bus using IP.

DETAILED DESCRIPTION

Figure 1A:
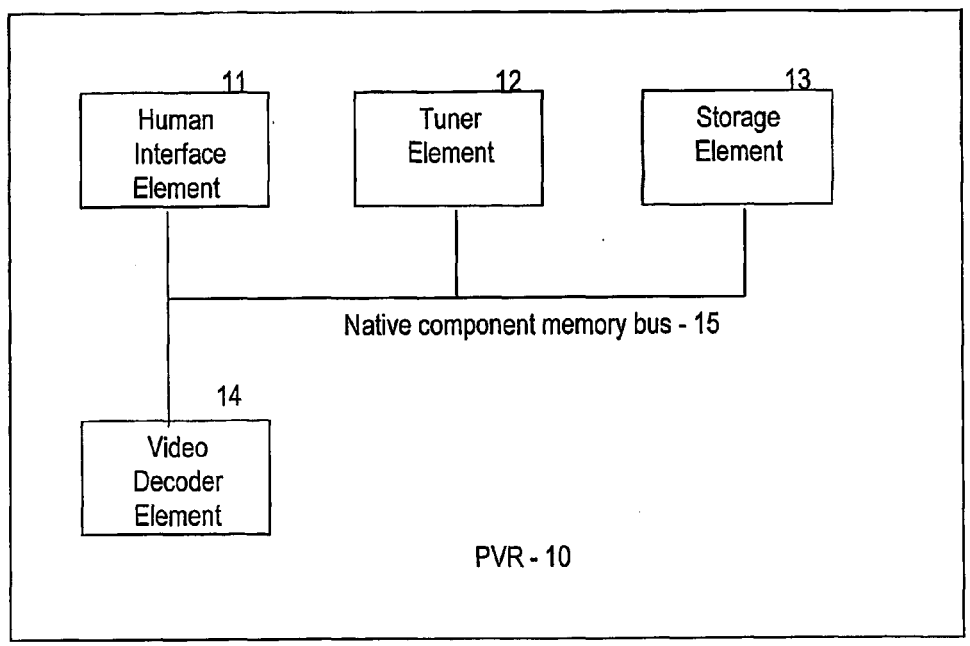
FIG. 1A is a schematic of a traditional component personal video recorder in which the elements shown are coupled by a native component I/O bus.
Figure 1B:
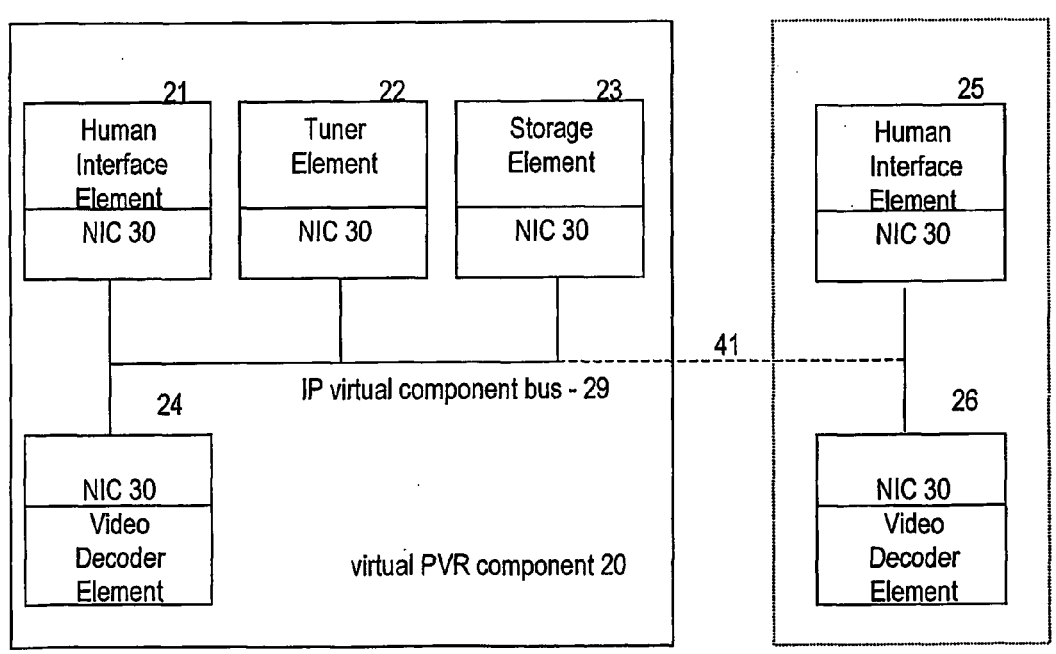
FIG. 1B is a schematic of a virtual component personal video recorder in which the elements shown are coupled by a native bus virtualized using IP.

In FIG. 1B a virtual component personal video recorder 20 is an electrical device (which term is used herein to include electronic devices) that generally includes a human interface 21, a tuner element 22, a storage element 23, and a video decoder element 24, all connected by IP across a network or virtualized native bus 29.

In this configuration, the tuner element 22, for example, would send information to the storage element 23 using packets having a header that contains the IP address of the storage element 23. Similarly, the storage element 23 would send information back to the tuner element 22 using packets having a header that contains the IP address of the tuner element 22.

It should be appreciated that each of the various elements 21–24 would need to have sufficient functionality to communicate using IP. That functionality could be designed into the elements, or added on to existing elements using an IP adapter 30. Indeed, the adapter in such circumstances would essentially be a simple block-to-packet and packet-to-block translator.

It should also be appreciated that the operative principles herein can operate across a network acting as a virtual bus, or a wide variety of physical buses and protocols. Examples are ATA, ATAPI, SCSI, Fiber CH, PCMCIA, CardBus, and USB. The term IP is used herein generically with reference to any internetworking protocol that handles packets.

Disaggregated Devices

Each of the elements can have any suitable physical form. For example, the storage element 23 can correspond to a RAM or ROM chip or chip bank, a rotating memory, a sequential tape type memory, and so on.

Use of IP to interconnect the various elements means that they can be located together in the same housing (not shown), or geographically disaggregated as shown by dotted line 40. Indeed, the storage element 23 could be stationary on a desktop, while the remaining elements are all contained within a common housing that is carried about. Elimination of the housing restriction also means any number of additional elements can be incorporated. In FIG. 1B the PVR 20 can optionally include a second human interface 25 (such as a television display), and a corresponding second video decoder 26. Indeed, these optional elements 25, 26 might only be included from time to time, and might themselves be located in another housing or disaggregatred as depicted by dotted lines 41.

Viewed from another aspect, use of IP to interconnect the various elements means that a given device can be readily shared by many other disaggregated elements. Thus, multiple PVRS, a television, and a computer could all share the same disk drive.

An interesting aspect of the personal video recorder 20 is that the various elements can communicate as peers on a peer-to-peer network. This can completely eliminate dependence on any particular operating system, and can eliminate operating systems altogether. In addition, many of the elements attached to the network will be dependent on other elements attached to the network to perform tasks that are not within their individual capacities, and will be able to discover, reserve, and release the resources of other peers needed to perform such tasks. Peers will preferably be able to discover the other elements attached to the network, the characteristics of the other elements attached to the network, and possibly the contents of at least some of the elements attached to the network. Such discovery is accomplished without the assistance of a master device, and will preferably involve direct communication between the peer elements.

Preferred networks will be masterless in that all elements have equal access to the network and the other elements attached to the network. The peer elements of the network will preferably communicate with each other utilizing low-level protocols such as those that would equate to those of the transport and lower layers of the OSI model. Preferred embodiments will utilize IP and UDP protocols for communication between elements.

Storage Element

It is contemplated the storage space available on preferred storage elements will be logically or physically divided into smaller storage spaces that will be referred to herein as partitions. Such partitions preferably comprise a plurality of storage locations (i.e. blocks), and each has associated with it a unique identifier that may be referred to as a logical block address (LBA). If a storage element comprises a hard disk such as is in common use in personal computers, the partitions, blocks, and LBAs of the storage element may be equivalent to partitions, blocks, and LBAs of the hard disk. Alternatively, the partitions, blocks, and LBAs may simply be a model by which other elements may interact with a storage element.

There are two features of preferred storage elements that are contemplated as being particularly advantageous. One such feature is that the storage elements comprise a plurality of network addresses such that network traffic addressed with any of such addresses will be received by the corresponding storage element (or storage elements). The second such feature is that each partition of the storage element is associated with one unique network address. As an example, a storage element attached to an IP network could be assigned a plurality of IP addresses with one IP address being dedicated to and associated with each partition of the storage element.

It is contemplated that utilizing network addresses to both route packets between network elements and within at least one such element facilitates the use of very light protocols for communication between elements. More particularly, in a packet based network having storage units divided into partitions attached to it, mapping network addresses to partitions of the storage elements is contemplated to simplify communications by allowing the network address to identify both the element on the network that a network packet is to be sent to, and the partition that the contents of the packet are intended to affect. Thus, in an IP network where IP addresses are the network addresses, the storage element and partition may be directly addressed at the IP level of TCP/IP or UDP/IP stack.

Preferably, storage elements are able to dynamically create partitions upon receipt of requests from network elements, and the network addresses for such partitions are obtained from an address server such as a DHCP server upon request from the storage element. Assignment of IP addresses to partitions will preferably also occur during initialization of the storage element such as when the storage element is first turned on. When a network element requests use of a storage element, the network element will preferably provide a unique identifier, possibly a name, to the storage element, and the storage element will in turn associate the identifier with any newly created partition.

It is important to note that address allocation devices such as DHCP servers are not masters, since they don't control the network, elements coupled to the network, or the sharing of resources between elements.

Since a particular storage element may comprise multiple partitions but only a single network interface card (NIC), it is preferred that storage elements be able to obtain multiple network addresses despite having a single NIC and a single media access control (MAC) address. This can be accomplished by providing a unique partition identifier to an address server when trying to obtain a network address from the address server. It is contemplated that associating a name provided by an element with any partition created for that element makes it possible to identify each of the partitions of an storage element despite the fact that network address associated with each partition may have changed since the partition was created.

A network element will request a particular size portion of the overall storage of a storage element, and it is contemplated that in some networks, a particular network element may be able to request that a storage element make all of its storage available to that element.

Communications

In preferred embodiments, communications between elements, particularly communications between a storage element and a non-storage element, will utilize a datagram protocol in which data blocks are atomically mapped to a target device. A datagram sent between elements will preferably comprise command (CMD), logical block address (LBA), data, and token fields, and no more than X additional bytes where X is one of 1, 2, 5, 10, 15, and 30. The data field of such a datagram is preferably sized to be the same as the block size (if applicable) of the element to which the datagram is addressed. As such, an element sending a quantity of data to a storage element where the quantity of data is larger than the block size of the storage element will typically divide the quantity of data into blocks having the same size as the blocks of the storage element, assign LBAs to the blocks, and send each block and LBA pair to the storage element in a datagram.

It is preferred that the datagrams be communicated between elements encapsulating them within addressed packets such as IP packets, and the network address of the encapsulating packet be used to identify both the element a packet is intended to be sent to, and the partition within the element that the datagram pertains to.

It is preferred that datagram recipients, handle datagrams on a first come, first served basis, without reordering packets, and without assembling the contents of the data fields of datagrams into a larger unit of data prior to executing a command identified in the CMD field. As an example, an storage element may receive a datagram containing a block of data, an LBA, and a write command. The storage element, without having to wait for any additional packets, utilizes the network address of the packet enclosing the datagram to identify the partition to be used, and utilizes the LBA to identify the location within the partition at which the data in the data field is to be written.

Handling the data in individual datagrams as they arrive rather than reassembling the data permits the use of an implied ACK for each command. Using an implied rather than an explicit ACK results in a substantial increase in performance.

In FIG. 2, a home entertainment system 110 generally includes a television 111, a tuner 112, a decoder 113, a remote control 114, a DVD player 115, speakers 116, and a random access storage device 117, each of which can be addressed using its own IP address. In this instance some of the various elements are connected by hard wiring 120, while others are connected using a wireless virtual bus 130 using IP. Also shown is a cable modem connection 140 to the Internet 142. The Internet 142 is employed herein merely as an example of a public package switched network, and those skilled in the art will recognize that the same principles apply to local area networks and other private and public package switched network.

In the particular example of FIG. 2, the tuner 112, decoder 113, and random access storage device 117 are all housed in a common cabinet of a set top box designated by dotted line 118. In alternative embodiments these elements could be disaggregated. Similarly, any of the elements (as well as others not shown) could be aggregated into one or more common housings.

Of particular advantage is that the various elements of home entertainment system 110 can be located in different rooms. Thus, the television 111, tuner 112, decoder 113, remote control 114, and amplifier/speaker 116 could all be located in a family room (not shown), while the DVD player 115 and random access storage device 117 could be included in a computer (not shown) located in a bedroom. But since each of the elements can communicate via their own IP addresses, it is irrelevant to each element where the other elements are located. Indeed, the television 111 could just as easily access information stored on a mass storage in a friend's house across town, or in another country. Additional details can be found in concurrently filed PCT application No. 10/473,713, entitled "Communication Protocols, Systems and Methods" and PCT application No. 10/473,509, entitled "Data Storage Devices Having IP Capable Partitions", the disclosures of which are incorporated herein by reference.

Any of the elements of home entertainment system 110 can be used independently, or in combination with, any of the other elements. For example, a radio is really a combination of the tuner 112 and the amplifier/speaker 116 working together. Tuning and volume controls can be located on those particular elements, or can be located on a standard remote control (not shown) that interfaces with those elements in a traditional manner. Tuning and volume controls could even be located on a web-enabled PDA, since the PDA could then communicate with the tuner 112 and the amplifier/speaker 116 over a LAN, WAN, or other package switched network.

Figure 3:
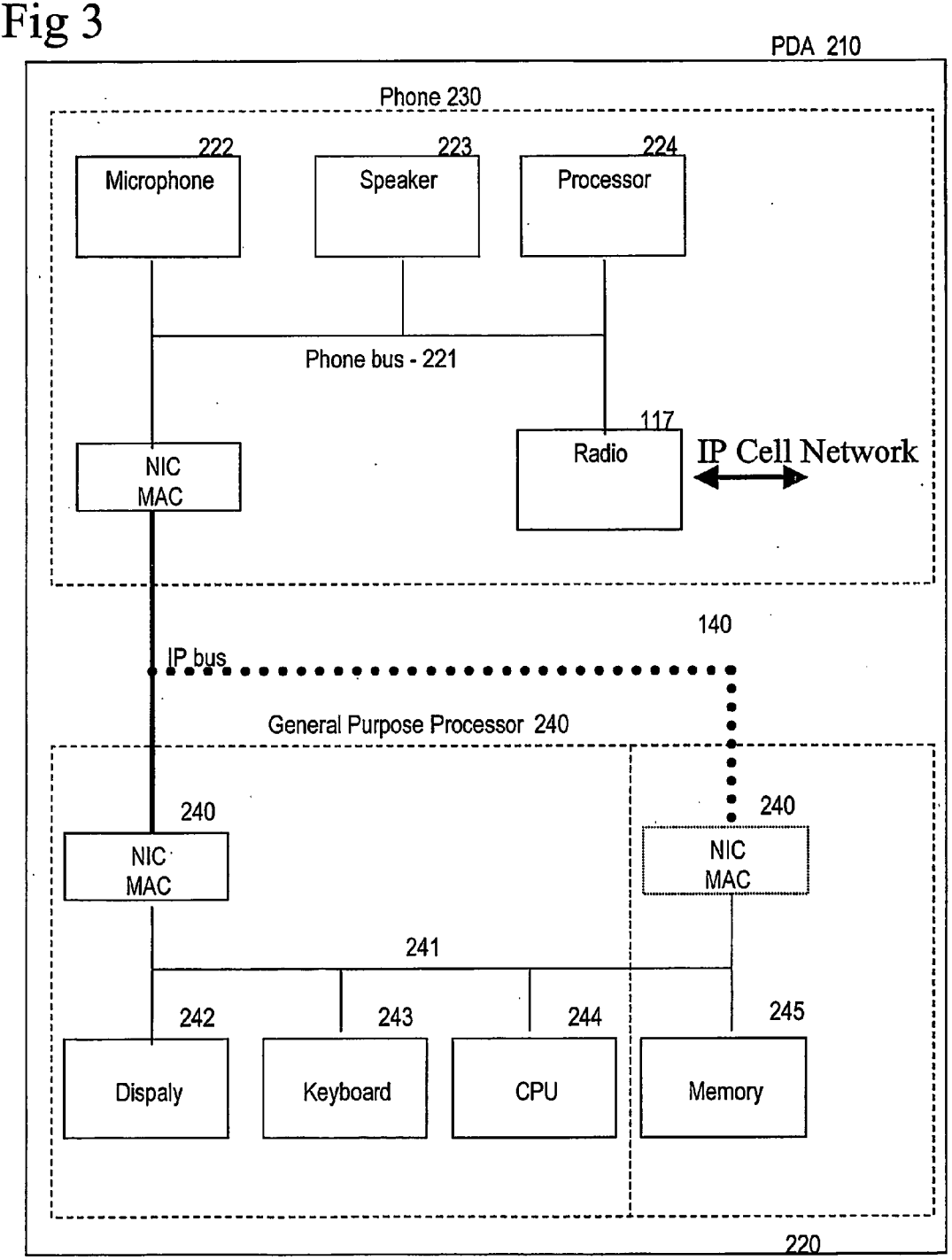
FIG. 3 is a schematic of a personal digital assistant having a telephone, in which the elements shown are coupled by a wireless virtual bus using IP.

Since physical proximity is not essential, the home entertainment system 110 might also include other elements on an occasional basis, such as the PVR of FIG. 1B and the telephone portion in the PDA of FIG. 3. That way a user could talk over the telephone, viewing the person at the other end on the television 111. The conversation could even be stored on the storage element 23, which might be in another room, or thousands of miles away. This is all facilitated by the various elements having their own IP addresses, and communicating using IP protocol, which is not limited by point-to-point connections.

It is contemplated that once persons in the industry recognize the benefits of elements that use their own IP address to execute packet communication with other elements, companies will start producing and/or marketing such elements. It is also contemplated that companies will start producing and/or marketing adapters that includes a functionality (hardware or software, or come combination of the two) to permit traditional elements to operate in the manner of the IP enabled elements.

Thus, methods falling within the inventive subject matter include manufacturing or selling an element that can utilize its own IP address to execute packet communication with other elements. Other inventive methods include manufacturing or selling adapters that enable prior art type elements to use their own IP address to execute packet communication with other elements. Indeed it is contemplated that companies will recognize that such adapters are available, and will continue to manufacture or sell prior art type elements, knowing (or even advertising) that users can employ such adapter to enable such prior art type elements to use their own IP address to execute packet communication with other elements.

In FIG. 3 a personal digital assistant 210 has a housing 220 that contains a telephone portion 230 and general purpose CPU portions 230, 240, connected on PDA bus 250. The telephone and CPU portions 220, 230 have their own IP addresses. They communicate with the outside world, and can communicate with each other across PDA bus 250 using IP.

Telephone portion 230 has its own bus 221 that connects a microphone 222, a speaker 223, and a processor 224. Notwithstanding the existence of the telephone bus 221, the telephone portion 220 is still considered to be an element as that term is employed herein because of atomicity. The microphone 222, speaker 223, and processor 224 do not have their own IP addresses and are not addressed using IP, and the telephone portion 220 is thus the smallest unit that has its own IP address and is addressed using IP.

The general purpose PDA CPU portion 240 has its own bus 241 that connects display 242, keyboard 243, CPU 244, and memory portion 245. If the memory portion 245 has its own IP address and is addressed using IP, then the memory portion 245 is considered an element. If not, then the principle of atomicity provides that the entire general purpose CPU portion 240 is considered an element.

Figure 4:
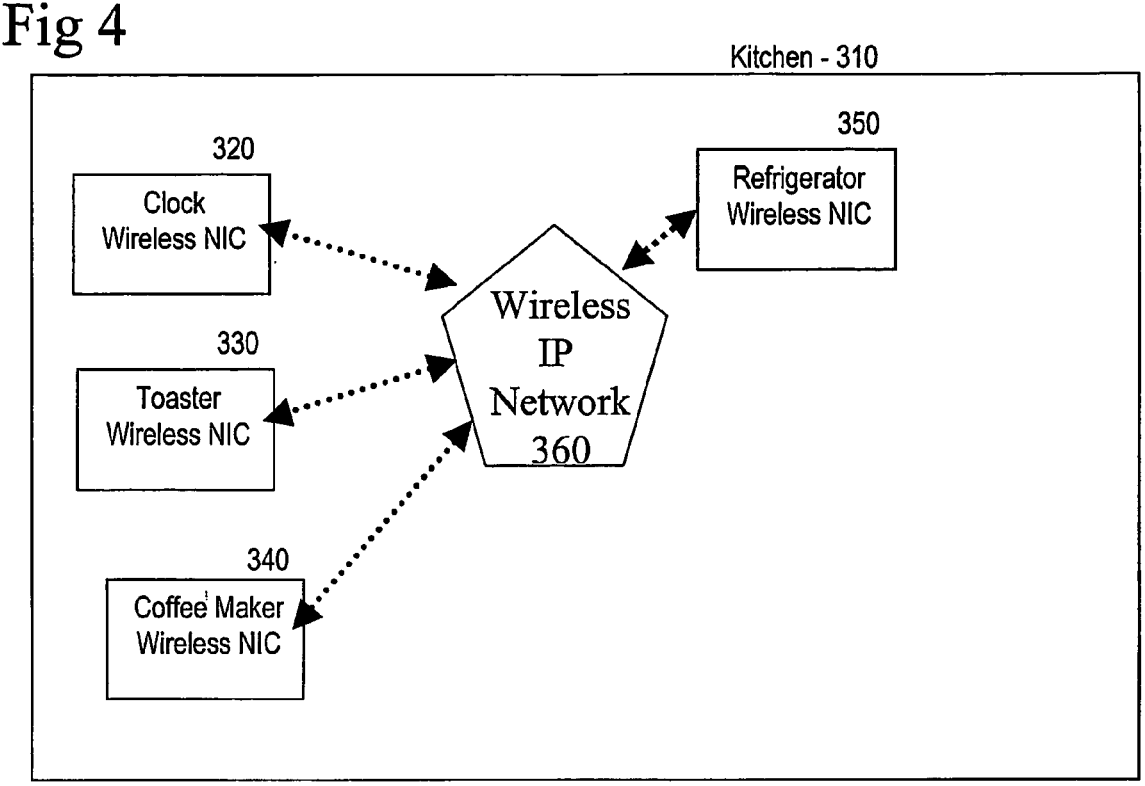
FIG. 4 is a schematic of a kitchen having a clock, a toaster, a coffee maker, and a toaster, all having their own IP addresses and all coupled by a wireless virtual bus using IP.

In FIG. 4, a kitchen 310 has multiple appliances, namely a clock 320, a toaster 330, a coffee maker 340, and a refrigerator 350, all of which are coupled by a wireless virtual bus 360.

These appliances can talk to one another using IP without control by any external computer. Thus, the toaster 330 and coffee maker 340 may receive time signals from the clock 320, and use those signal to determine when to begin operation in the morning. This type of interconnectivity would avoid having to reset onboard clocks whenever the power to these appliances is interrupted, or the time changes according to daylight savings time.

It is important to note that the various elements 320, 330, 340, 350 may not be hard-wired at all using any physical bus. As a result, they can be interchanged or upgraded, moved or removed as desired. The clock 320, for example, could be just as easily be located in the kitchen 310 as in a bedroom (not shown) or the bureau of standards in Washington (not shown).

The various elements 320, 330, 340 can also be combined with any other elements, anywhere else that is reachable by IP. For example, if the household is to be shut down for an extended period of time, the PDA of FIG. 3 could be used to send a signal to the refrigerator 350 to reduce the temperature by a few degrees.

Thus, specific embodiments and applications of the inventive electrical devices have been disclosed. It should be apparent, however, to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced.

What is claimed is:

1. An electrical device comprising a plurality of elements within a housing:
   wherein each of the elements has its own IP address and receives communications from exterior devices using packets of information that are addressed using that IP address;
   wherein the elements communicate with each other using the IP addresses; and
   wherein topology of the elements and characteristics of each of the plurality of elements is discoverable by the exterior devices as being logical partitions of the device.

2. The electrical device of claim 1, wherein the device comprises a camera.

3. The electrical device of claim 1, wherein the device comprises a radio.

4. The electrical device of claim 1, wherein the device comprises a television.

5. The electrical device of claim 1, wherein the device comprises a telephone.

6. The electrical device of claim 1, wherein the device comprises a kitchen appliance.

7. The electrical device of claim 1, further comprising a mass storage, wherein at least one of the plurality of elements is a logical disk segment.

8. The electrical device of claim 1, further comprising at least one of a keyboard, a display screen, an audio input and an audio output.

9. The electrical device of claim 1, further comprising a keyboard, a display screen, an audio input, and an audio output, and a mass storage.

10. The electrical device of claim 1, wherein at least two of the elements contain functionality to communicate with each other using the packets through a public packet switched network.

11. The electrical device of claim 1, wherein at least one of the elements includes a mass storage.

12. The electrical device of claim 1, wherein the plurality of elements contain functionality to communicate with each other without using a native (local) bus.

13. The electrical device of claim 1, wherein the plurality of elements contain functionality to communicate with each other using a native (local) bus virtualized by IP.

14. The electrical device of claim 1, further comprising wireless functionality that carries least some of the packets are carried across a wireless network.

15. The electrical device of claim 1, wherein at least two of the elements contain functionality to communicate with each other using a peer-to-peer protocol.

16. A mass storage device comprising:
   a plurality of physical elements configured to mate with a physical bus of the device;
   wherein the elements are divided into logical partitions that are not necessarily coextensive with boundaries of the physical elements;
   wherein each of the partitions has its own IP address that it uses to communicate outside the device; and
   wherein characteristics of the partitions are discoverable from outside the device by querying the IP addresses.

17. The device of claim 16 further comprising a tactual human interface.

18. The device of claim 16, further comprising a connection to a wireless network.

19. The device of claim 16, wherein the element is at least one of a television, a tuner, and a signal decoder.

20. An adapter that includes functionalities that allow a legacy device to operate as a mass storage device according to claim 16.

21. A personal video recorder system comprising a housing that encloses a plurality of elements including a human interface a tuner, a decoder, and a storage device according to claim 16.

22. The system of claim 21 further comprising a second human interface element that is also adapted to send and receive IP packets and to communicate with the other elements of the system via such IP packets.

* * * * *